United States Patent
Shintani (10) Patent No.: US 8,416,340 B2
(45) Date of Patent: Apr. 9, 2013

(54) CAMERA SYSTEM, CAMERA BODY, AND INTERCHANGEABLE LENS UNIT

(75) Inventor: Dai Shintani, Osaka (JP)

(73) Assignee: Panasonic Corporation, Osaka (JP)

( * ) Notice: Subject to any disclaimer, the term of this patent is extended or adjusted under 35 U.S.C. 154(b) by 342 days.

(21) Appl. No.: 12/783,072

(22) Filed: May 19, 2010

(65) Prior Publication Data
US 2010/0295963 A1 Nov. 25, 2010

(30) Foreign Application Priority Data

May 21, 2009 (JP) ................................. 2009-122870

(51) Int. Cl.
*H04N 5/225* (2006.01)
(52) U.S. Cl.
USPC .............................. 348/360; 348/335; 348/375
(58) Field of Classification Search .................. 348/360, 348/335, 375
See application file for complete search history.

(56) References Cited

U.S. PATENT DOCUMENTS

| 7,102,686 B1 * | 9/2006 | Orimoto et al. ............... 348/375 |
| 2006/0146152 A1 * | 7/2006 | Jo et al. ........................ 348/272 |
| 2007/0070204 A1 * | 3/2007 | Mentzer .................... 348/207.99 |
| 2007/0248356 A1 * | 10/2007 | Toji ............................... 396/529 |
| 2009/0067828 A1 * | 3/2009 | Ono et al. ...................... 396/128 |

FOREIGN PATENT DOCUMENTS

| JP | 05-276429 A | 10/1993 |
| JP | 2000-175089 A | 6/2000 |
| JP | 2001-160911 A | 6/2001 |
| JP | 2006-246224 A | 9/2006 |
| JP | 2006-254088 A | 9/2006 |

* cited by examiner

*Primary Examiner* — Sinh Tran
*Assistant Examiner* — Paul Berardesca
(74) *Attorney, Agent, or Firm* — Pearne & Gordon LLP (57) ABSTRACT

A camera body includes a body mount, a first imaging sensor, an information acquisition section, and an imaging sensor selector. The information acquisition section is configured to acquire imaging sensor information from the interchangeable lens unit. The imaging sensor selector selects a first imaging sensor as the selected imaging sensor on the basis of the imaging sensor information when an interchangeable lens unit that guides an optical image to the first imaging sensor is mounted to the body mount, and selects a second imaging sensor as the selected imaging sensor on the basis of the imaging sensor information when an interchangeable lens unit having this second imaging sensor is mounted to the body mount.

20 Claims, 7 Drawing Sheets

CAMERA SYSTEM, CAMERA BODY, AND INTERCHANGEABLE LENS UNIT

CROSS-REFERENCE TO RELATED APPLICATIONS

This application claims priority under 35 U.S.C. §119 to Japanese Patent Application No. 2009-122870 filed on May 21, 2009. The entire disclosure of Japanese Patent Application No. 2009-122870 is hereby incorporated herein by reference.

BACKGROUND

1. Technical Field

The technologies disclosed herein relate to a camera body, a camera system, and an interchangeable lens unit comprising an imaging sensor for performing opto-electric conversion.

2. Description of the Related Art

Digital cameras, with which an imaging sensor such as a CCD (charge coupled device) imaging sensor or a CMOS (complementary metal-oxide semiconductor) imaging sensor is used to convert a subject image into an electrical signal, have rapidly grown in popularity in recent years.

In a compact digital camera, a lens unit and a camera body having an imaging sensor are integrated. Convenience is important with compact digital cameras, and they are capable not only of still picture imaging, but also moving picture imaging.

On the other hand, high performance is more important with an interchangeable lens type of camera system. More specifically, an interchangeable lens unit can be mounted to and removed from a camera body. A number of interchangeable lens units of various performance are readied and used as dictated by the situation. The user can replace these interchangeable lens units on the camera body in taking pictures.

In the interchangeable lens type of camera systems widely available on the market, an imaging sensor is provided to the camera body. The interchangeable lens unit guides an optical image of the subject to the imaging sensor of the camera body. That is, the interchangeable lens unit has no imaging sensor.

Meanwhile, Japanese Laid-Open Patent Application 2000-175089 discloses a camera system made up of an interchangeable lens unit having an imaging sensor, and a camera body that does not have an imaging sensor.

Also, Japanese Laid-Open Patent Application 2006-254088 discloses a camera system made up of an interchangeable lens unit that has an imaging sensor, and a camera body that also has an imaging sensor. With this camera system, the imaging sensor of the camera body is also equipped with a lens for forming an optical image. The camera body is able to capture images even when no interchangeable lens unit has been mounted.

SUMMARY

As discussed above, almost none of the interchangeable lens units widely available on the market have an imaging sensor. Therefore, with the camera bodies discussed in the above-mentioned documents, most of the interchangeable lens units already purchased by consumers cannot be mounted for use in imaging.

A camera body disclosed herein allows the mounting of an interchangeable lens unit that forms an optical image of a subject. This camera body comprises a body mount, a first imaging sensor, an information acquisition section, and an imaging sensor selector. The body mount is provided to allow the interchangeable lens unit to be mounted. The first imaging sensor is configured to convert an optical image into first image data by opto-electric conversion. The information acquisition section is configured to acquire imaging sensor information from the interchangeable lens unit. The imaging sensor selector selects the first imaging sensor as the selected imaging sensor on the basis of the imaging sensor information when an interchangeable lens unit that guides an optical image to the first imaging sensor is mounted to the body mount, and selects a second imaging sensor as the selected imaging sensor on the basis of the imaging sensor information when an interchangeable lens unit having this second imaging sensor is mounted to the body mount.

A camera system disclosed herein comprises an interchangeable lens unit and a camera body. The interchangeable lens unit has an optical system for forming an optical image of a subject, a second imaging sensor configured to convert the optical image into second image data by opto-electric conversion, and a lens storage section configured to store imaging sensor information indicating that the second imaging sensor is mounted. The camera body has a first imaging sensor configured to convert the optical image into first image data by opto-electric conversion, an information acquisition section configured to acquire imaging sensor information from the interchangeable lens unit, and an imaging sensor selector configured to select the second imaging sensor on the basis of the imaging sensor information.

An interchangeable lens unit disclosed herein has an optical system configured to form an optical image of a subject, a lens-side imaging sensor, and a sensor information storage section. The lens-side imaging sensor is configured to convert the optical image into image data by opto-electric conversion. The sensor information storage section is configured to store imaging sensor information indicating that the lens-side imaging sensor is mounted.

BRIEF DESCRIPTION OF THE DRAWINGS

Referring now to the attached drawings, which form a part of this original disclosure.

DETAILED DESCRIPTION OF EMBODIMENTS

Selected embodiments of the digital camera will now be explained with reference to the drawings. It will be apparent to those skilled in the art from this disclosure that the following descriptions of the embodiments of the digital camera are provided for illustration only and not for the purpose of limiting the invention as defined by the appended claims and their equivalents.

First Embodiment

Figure 1:
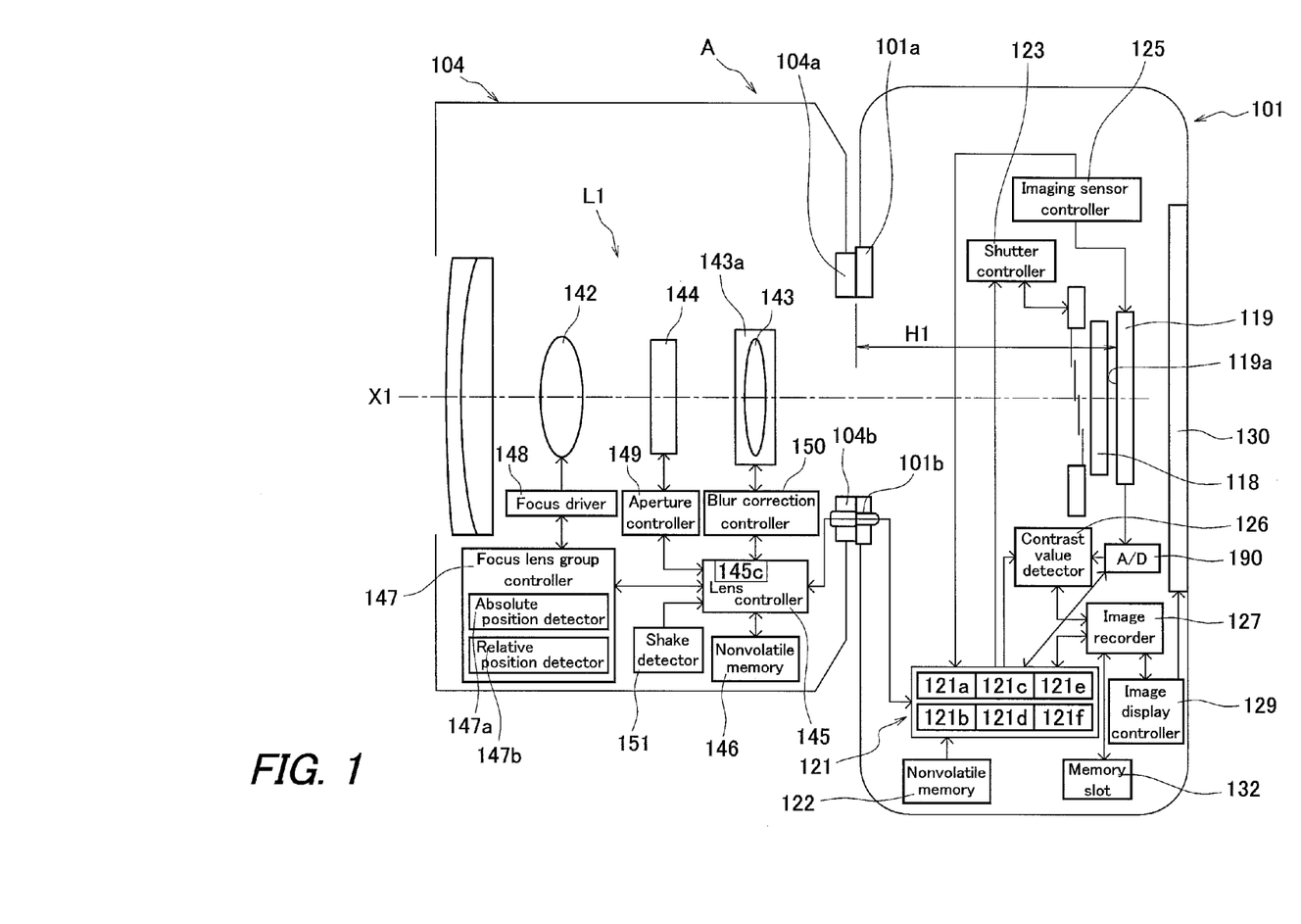
FIG. 1 is a simplified diagram of the constitution of a camera system (when the interchangeable lens unit has no imaging sensor)
Figure 2:
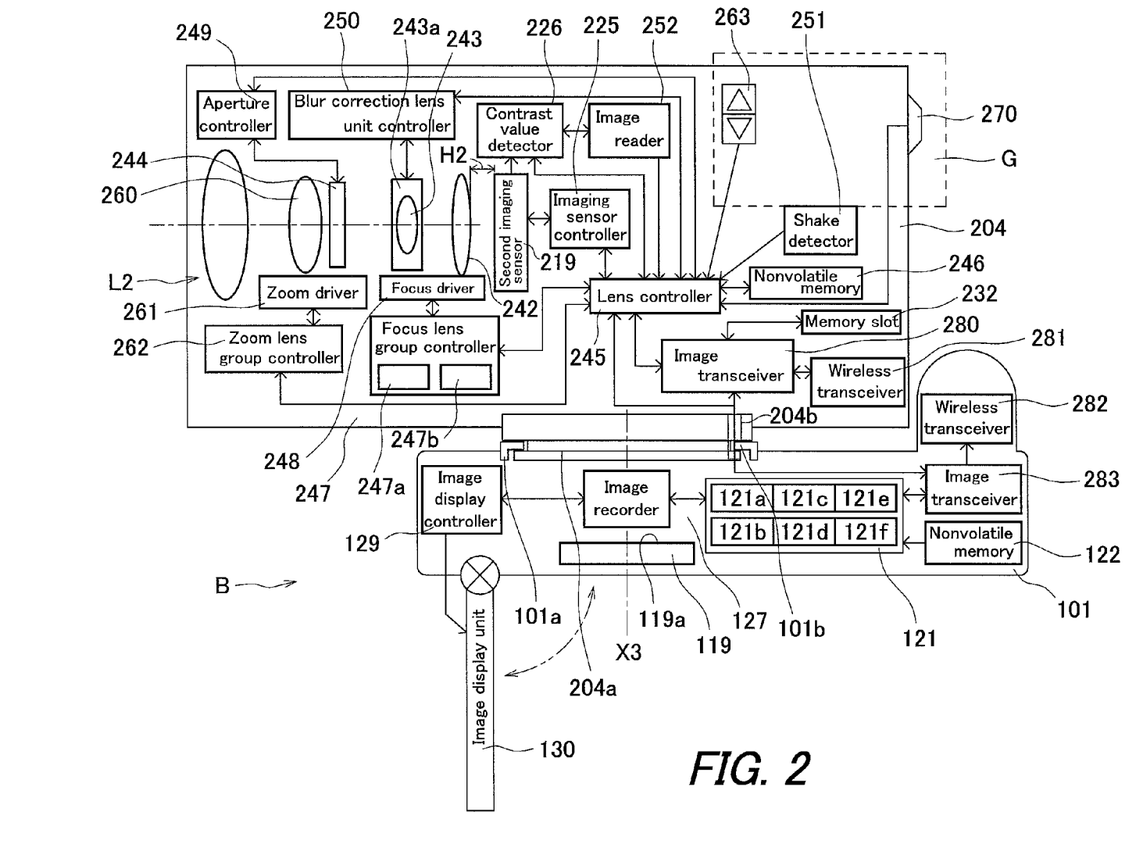
FIG. 2 is a simplified diagram of the constitution of a camera system (when the interchangeable lens unit has an imaging sensor)

A camera body 101 according to a first embodiment will now be described through reference to FIGS. 1 and 2. FIG. 1 is a simplified diagram of the constitution of a camera system A in which the camera body 101 according to the first embodiment is combined with a first interchangeable lens unit 104 that has no imaging sensor. FIG. 2 is a simplified diagram of the constitution of a camera system B in which the camera body 101 is combined with a second interchangeable lens unit 204 that has an imaging sensor.

1: Combination with First Interchangeable Lens Unit Having No Imaging Sensor

As shown in FIG. 1, the camera system A is an interchangeable lens type of digital camera system, and comprises a camera body 101 having the main functions of the camera system A, and a first interchangeable lens unit 104 that is removably mounted to the camera body 101. The first interchangeable lens unit 104 is mounted to a body mount 101a provided to the front face of the camera body 101. The first interchangeable lens unit 104 has no imaging sensor, and forms an optical image of a subject on a first imaging sensor 119 of the camera body 101.

1.1: Camera Body

The camera body 101 has the first imaging sensor 119, an IR-cutout/OLPF (Optical Low Pass Filter) 118 for removing infrared light and reducing moire from a subject image incident on the imaging sensor, a shutter unit 117 for adjusting the exposure state of the first imaging sensor 119, a shutter controller 123 for controlling the drive of the shutter unit 117 on the basis of a control signal from a body controller 121, an imaging sensor controller 125 for controlling the operation of the first imaging sensor 119, an image recorder 127 with which image data can be recorded to a memory and read out from the memory, an image display unit 130 for displaying captured images, live view images, and various information, an image display controller 129 for controlling the display of the image display unit 130, a memory slot 132 in which a memory for holding image data can be inserted and removed, and a contrast value detector 126 for detecting a focal point (a focused subject image) from the contrast value of a subject image during live view. The contrast value here is a numerical value obtained by integrating the high-frequency component out of the spatial frequency component of the image data.

The first imaging sensor 119 converts an optical image of a subject into electrical image data by opto-electric conversion. The first imaging sensor 119 is a CCD (charge coupled device) imaging sensor or a CMOS (complementary metal-oxide semiconductor) imaging sensor, for example. The imaging sensor controller 125 controls the operation of the first imaging sensor 119 on the basis of a control signal from the body controller 121. The image data produced by the first imaging sensor 119 is digitized by an A/D converter 190 (an example of a conversion processor). The image data digitized by the A/D converter 190 is subjected to various image processing by the body controller 121. The various image processing referred to here includes, for example, gamma correction processing, white balance correction processing, scratch correction processing, YC conversion processing, electronic zoom processing, compression processing, still picture file production, and moving picture file production. In this embodiment, the body controller 121 has a correction processor 121a and a compression processor 121b. The correction processor 121a subjects the image data to gamma correction processing, white balance correction processing, scratch correction processing, YC conversion processing, and electronic zoom processing, for example. The compression processor 121b subjects the image data processed by the correction processor 121a to specific compression processing to produce display-use image data.

The IR-cutout/OLPF (Optical Low Pass Filter) 118 is disposed on the subject side of the first imaging sensor 119. The IR-cutout/OLPF 118 removes infrared light from subject light guided from the first interchangeable lens unit 104, and transmits the rest of the light. The IR-cutout/OLPF 118 also reduces moire.

The shutter unit 117 adjusts the exposure state of the first imaging sensor 119. More specifically, the shutter unit 117 is disposed on the subject side of the first imaging sensor 119, and either blocks or transmits subject light coming from the first interchangeable lens unit 104, and thereby adjusts how long the first imaging sensor 119 is exposed. The shutter unit 117 is a focal plane shutter having a screen, for example. The shutter controller 123 controls the drive of the shutter unit 117 on the basis of a control signal from the body controller 121.

The image recorder 127 reads image data or moving picture data, etc., from a memory mounted in the memory slot 132. The image recorder 127 also records image data or moving picture data, etc., to a memory mounted in the memory slot 132. The memory slot 132 is a removable memory such as a card-type recording medium, for example. A nonvolatile memory that is fixed to the camera body 101 may also be used instead of the memory slot 132 and the memory.

The image display unit 130 displays image data as a visible image. The image display unit 130 also displays live view images. The image display unit 130 also displays various information such as the status of the camera body 101 and imaging conditions. A "live view image" is used to successively display images sequentially captured by the first imaging sensor 119, on the image display unit 130. In other words, a live view image is a substantially real-time moving picture image of a subject. The image display controller 129 controls the display of the image display unit 130.

The contrast value detector 126 detects a contrast value on the basis of image data from the first imaging sensor 119. The contrast value detector 126 also detects the focal state of a subject image by what is commonly known as the mountain climbing method.

The body controller 121 is a control device serving as the functional center of the camera body 101, and controls various sequences. More specifically, the body controller 121 is equipped with a CPU, ROM, RAM, etc., and the body controller 121 can perform many different functions when programs held in the ROM are read into the CPU. For instance, the body controller 121 has the function of detecting that the first interchangeable lens unit 104 has been mounted on the camera body 101, the function of selecting whether or not to perform image blur correction with some image blur correction device, the function of setting the image blur correction device to a state in which correction is possible or impossible, and so on. As shown in FIG. 1, the body controller 121 is connected to the various components provided to the camera body 101. Also, as mentioned above, the body controller 121 functions as the correction processor 121a and compression processor 121b for subjecting image data to processing. Furthermore, the body controller 121 functions as an imaging sensor selector 121d for selecting which imaging sensor to use for imaging. The body controller 121 also functions as an information acquisition section 121f for acquiring lens information from the interchangeable lens unit that has been mounted.

The camera body 101 is provided with a power switch (not shown) for turning on and off the power to the camera system A, and a release button (not shown) that is operated when the user focuses and releases the shutter. When the power is switched on with the power switch, power is supplied to the various components of the camera body 101 and the first interchangeable lens unit 104.

Further, various information related to the camera body 101 (body information) is held in a nonvolatile memory 122. This body information includes, for example, information related to the model, for identifying the camera body 101, such as the name of the manufacturer of the camera body 101, the date of manufacture, the model number, the version of software installed in the body controller 121, and information related to firmware updates (body specification information), as well as information related to whether or not the camera body 101 is equipped with an image blur corrector, information related to sensitivity and other aspects of detection performance, error history, and so forth. This information can be held in a memory inside the body controller 121 instead of in the nonvolatile memory 122.

1.2: Interchangeable Lens Unit

The first interchangeable lens unit 104 has an optical system L1, a focus adjuster for performing focusing, an aperture adjuster for adjusting the aperture, an in-lens image blur correction device for correcting image blur by adjusting the optical path, a lens controller 145 serving as a lens controller for controlling the operation of the first interchangeable lens unit 104, and a nonvolatile memory 146. The optical system L1 forms an optical image of a subject. The optical image formed by the optical system L1 is formed on the first imaging sensor 119.

The first interchangeable lens unit 104 also comprises a lens mount 104a. Fitting the lens mount 104a to the body mount 101a allows the first interchangeable lens unit 104 to be mounted to the camera body 101.

The focus adjuster has a focus lens group 142 for adjusting the focus, a focus driver 148 for driving the focus lens group 142, and a focus lens group controller 147 for controlling the focus driver 148.

The aperture adjuster has an aperture 144 that adjusts how far the lens is stopped down or opened, and an aperture controller 149 that controls the operation of the aperture 144.

The focus lens group 142 is able to move in the optical axis direction over a range from the nearest focal position determined as a specification of the first interchangeable lens unit 104 to the infinity focal position. The focus lens group 142 also has a lens shift tolerance range over which movement is further possible back and forth in the optical axis direction beyond the above-mentioned range from the nearest focal position to the infinity focal position, since movement back and forth in the optical axis direction, on either side of the focal position, is necessary in the case of focal position detection by contrast method.

The focus lens group controller 147 has an absolute position detector 147a for detecting the absolute position of the focus lens group 142 in the optical axis direction, and a relative position detector 147b for detecting the relative position. The absolute position detector 147a is able to detect at least one absolute position of the focus lens group 142 in the optical axis direction. The relative position detector 147b cannot detect an absolute position by itself, but is able to detect a movement direction, and makes use of a two-phase encoder, for example. Examples of two-phase encoders include a rotary pulse encoder, an MR element, and a Hall element, with two sensors being provided that alternately output binary signals at equal pitches according to the position of the focus lens group 142 in the optical axis direction. The two sensors are disposed to offset the phase of the pitches. The lens controller 145 computes the relative position of the focus lens group 142 in the optical axis direction from the output of the relative position detector. The lens controller 145 finds the relative position of the focus lens group 142 in the optical axis direction from the output of the absolute position detector 147a, finds the relative position from this position from the output of the absolute position detector 147a, and computes the absolute position of the focus lens group 142 in the optical axis direction on the basis of these.

The in-lens image blur correction device has a blur correction lens 143, a blur correction lens drive controller 143a for driving the blur correction lens 143 in a plane perpendicular to the optical axis X1, and a blur correction controller 150 for controlling the drive of the blur correction lens 143. The image blur correction device further comprises a movement amount detector (not shown). The movement amount detector detects the actual amount of movement of the blur correction lens 143, and along with the blur correction controller 150 forms a feedback control loop for controlling the drive of the blur correction lens 143.

The lens controller 145 is a control device serving as the functional center of the first interchangeable lens unit 104, and is connected to the various components installed in the first interchangeable lens unit 104. More specifically, the lens controller 145 is equipped with a CPU, ROM, and RAM, and the lens controller 145 can perform many different functions when programs held in the ROM are read into the CPU. For instance, the lens controller 145 has the function of putting the in-lens image blur correction device in a correction enabled state or a correction disabled state on the basis of a signal from the body controller 121. Also, the body controller 121 and the lens controller 145 are electrically connected by a body electrical contact 101b provided to the body mount 101a and a lens electrical contact 104b provided to the lens mount 104a, allowing information to be exchanged between them.

Also, the nonvolatile memory 146 holds various information related to the first interchangeable lens unit 104 (lens information). This lens information includes, for example, information related to the model, for identifying the first interchangeable lens unit 104, such as the name of the manufacturer of the first interchangeable lens unit 104, the date of manufacture, the model number, the version of software installed in the lens controller 145, and information related to firmware updates (lens specification information), as well as information related to whether or not the first interchangeable lens unit 104 is equipped with an image blur correction device, and if an image blur correction device is installed, information related to detection performance, such as sensitivity and the model number of a shake detector 151, information related to correction performance, such as the maximum correctable angle and the model number of a shake correction controller 150, the version of software for performing image blur correction, and so forth. Lens information also includes information related to power consumption required for drive of the blur correction controller 150 (lens-side power consumption information), and information related to the drive method of the blur correction controller 150 (lens-side drive method information). Furthermore, the nonvolatile memory 146 can hold information that has been sent from the body controller 121. This information can be held in a memory inside the lens controller 145 instead of in the nonvolatile memory 146.

The shake detector 151 comprises an angular velocity sensor for detecting movement of the first interchangeable lens unit 104 caused by hand shake or the like. The angular velocity sensor outputs a positive or negative angular velocity signal according to the direction in which the first interchangeable lens unit 104 is moving, using the output when the first interchangeable lens unit 104 is stationary as a reference. In this embodiment, two angular velocity sensors are provided for detecting movement in both the yaw direction and the pitch direction. The outputted angular velocity signal goes through filtering, amplification, and other such processing, is converted into a digital signal by an A/D converter, and is sent to the lens controller 145.

1.3: Operation Before Imaging

Figure 3:
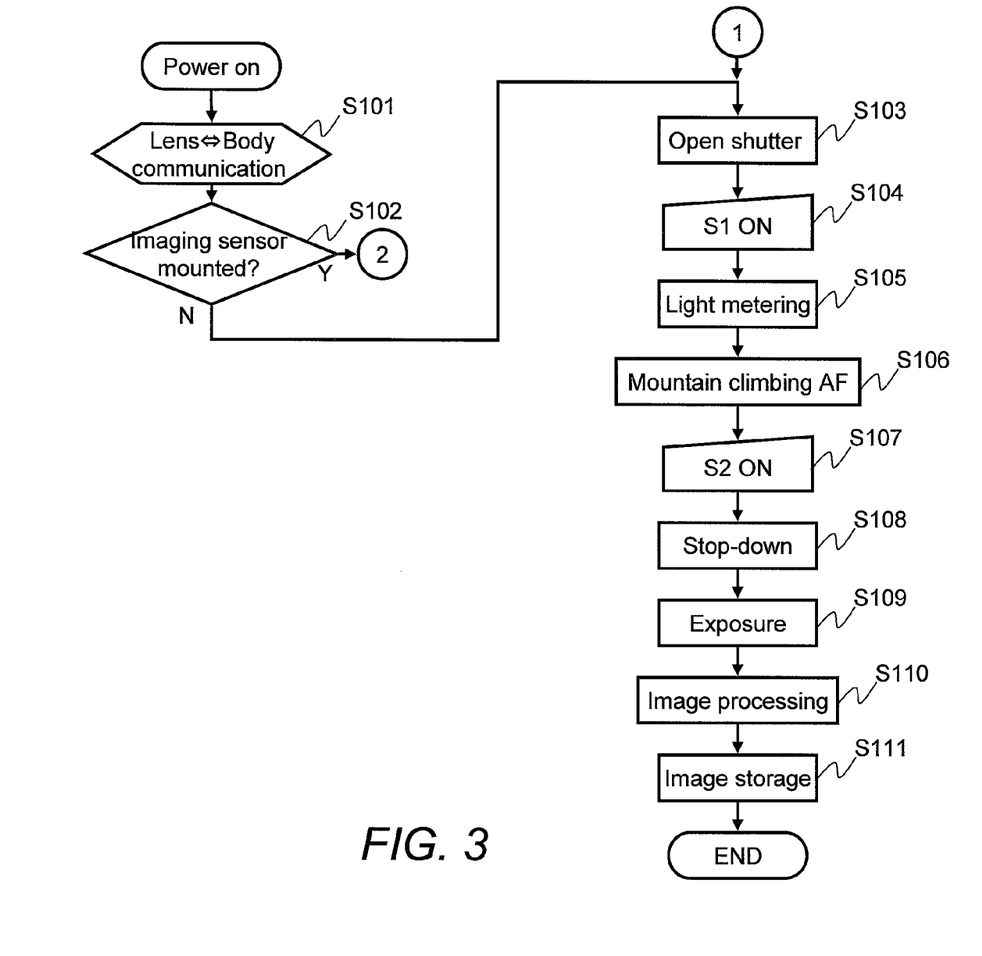
FIG. 3 is a flowchart of still picture imaging (when the interchangeable lens unit has no imaging sensor)

FIG. 3 is a flowchart of the operation of the camera system A when an interchangeable lens unit with no imaging sensor has been mounted. When the power supply (not shown) is switched on, power is supplied from the power supply (not shown) to the body controller 121 in the camera body 101 and the various units. Power is also supplied from the power supply to the lens controller 145 in the first interchangeable lens unit 104 and the various units via the lens electrical contact 104b and the body electrical contact 101b. The body controller 121 and the lens controller 145 are thereby activated.

The body controller 121 and the lens controller 145 are programmed to exchange information with each other at start-up via the lens contact 104b and the body contact 101b. For example, lens information related to the first interchangeable lens unit 104 is sent from a memory 145c of the lens controller 145 to the body controller 121 (step S101). This lens information is held in a memory 121c of the body controller 121.

At this point the body controller 121 decides whether or not the first interchangeable lens unit 104 is equipped with an imaging sensor on the basis of the lens information (step S102). For example, the body controller 121 decides whether or not the first interchangeable lens unit 104 is equipped with an imaging sensor on the basis of imaging sensor information included in the lens information held in the memory 121c. When information indicating that an imaging sensor is installed is included in the imaging sensor information, the imaging sensor selector 121d decides that the first interchangeable lens unit 104 is equipped with an imaging sensor. When information indicating that an imaging sensor is installed is not included in the imaging sensor information, the imaging sensor selector 121d decides that the first interchangeable lens unit 104 is not equipped with an imaging sensor.

Alternatively, for example, lens specification information about the first interchangeable lens unit 104 is acquired, this lens specification information is compared to a table listing the relation between whether or not there is an imaging sensor and lens specification information had by the body controller 121, and the imaging sensor selector 121d decides whether or not the first interchangeable lens unit 104 is equipped with an imaging sensor.

In this embodiment, the first interchangeable lens unit 104 does not have an imaging sensor, so when the first interchangeable lens unit 104 is mounted to the camera body 101, the imaging sensor selector 121d selects the first imaging sensor 119 as the selected imaging sensor. The selected imaging sensor is temporarily stored in a sensor storage component 121e of the body controller 121. While the first interchangeable lens unit 104 is mounted to the camera body 101, the selected first imaging sensor 119 is used to perform imaging.

1.4: Operation During Imaging

The operation of still picture imaging will be briefly described as an example. Light from a subject (not shown) goes through the first interchangeable lens unit 104 and is incident on the shutter unit 117. The shutter unit 117 is open at this stage (step S103). The light passes through the IR-cutout/OLPF 118 and is incident on the first imaging sensor 119, resulting in a state in which an image can be acquired. The subject image formed by the first imaging sensor 119 is converted into image data by the first imaging sensor 119. On the basis of this image data, the subject image is displayed as an image on the image display unit 130. The user can view an erect image of the subject through the image display unit 130.

When the user presses the release button half-way down (S1 switch is on) (step S104), the body controller 121 measures the brightness of the subject image on the basis of image data from the first imaging sensor 119 (step S105). The body controller 121 then performs a focusing operation by the so-called mountain climbing method using a contrast value (hereinafter referred to as contrast AF) (step S106). More specifically, the focus lens group 142 is moved in the optical axis direction, the position of the focus lens group 142 when the contrast value reaches its maximum is detected, and the focus lens group 142 is moved to that position. The sharper is the subject image, the higher the computed contrast value will be.

After this, when the user presses the release button all the way down (S2 switch is on) (step S107), the body controller 121 determines the aperture value on the basis of the brightness of the subject image, and sends a command to the lens controller 145 to set to this aperture value. The aperture controller 149 is controlled by the lens controller 145, and the aperture is stopped down to the designated aperture value (step S108).

Upon completion of the stop-down, exposure is performed (step S109). More specifically, first the shutter unit 117 is closed. Then the charge stored in the first imaging sensor 119 is reset at a drive command from the imaging sensor controller 125. Then the shutter controller 123 controls the shutter unit 117 so that it opens for a length of time calculated on the basis of the brightness of the subject image. As a result, the first imaging sensor 119 is exposed for the length time the shutter unit 117 is open, and a charge corresponding to this time is stored. The imaging sensor controller 125 reads image data from the first imaging sensor 119 and sends it to the A/D converter 190. The A/D converter 190 converts the analog signal sent from the first imaging sensor 119 into a digital signal, and sends the digitally converted image data to the body controller 121. After this the shutter controller 123 opens the shutter unit 117.

The body controller 121 subjects the image data to specific processing (hereinafter also referred to as image processing) (step S110). More specifically, for example, the correction processor 121a subjects the image data to gamma correction processing, white balance correction processing, scratch correction processing, YC conversion processing, and electronic zoom processing, for example. After this, the compression processor 121b subjects the image data to compression processing to produce a still picture file.

After the image processing, the still picture file is outputted via the image recorder 127 to the image display controller 129. Consequently, the captured image is displayed on the image display unit 130. The still picture file is also stored on a memory card installed in the memory slot 132 (step S111).

Finally, the body controller 121 performs resetting. More specifically, a command is issued from the body controller 121 to the aperture controller 149 to reset the aperture to the open position through the lens controller 145. A reset command is sent from the lens controller 145 to the various units. Upon completion of this resetting, the lens controller 145 tells the body controller 121 that resetting is complete. The body controller 121 awaits reset completion information from the lens controller 145 and the completion of a series of processing after exposure, after which it is confirmed that the release button has not bee pressed, and the imaging sequence is ended.

2: Combination with Second Interchangeable Lens Unit Having Imaging Sensor

A camera system B will be described through reference to FIG. 2. The camera system B shown in FIG. 2 is a combination of the camera body 101 according to the first embodiment and a second interchangeable lens unit 204 having an imaging sensor. Those components having substantially the same function as above will be numbered the same and will not be described in detail again.

As shown in FIG. 3, the camera system B is an interchangeable lens type of digital camera system, and comprises a camera body 101 and a second interchangeable lens unit 204 that is removably mounted to the camera body 101. The second interchangeable lens unit 204 is mounted to a body mount 101a provided to the front face of the camera body 101. The second interchangeable lens unit 204 has a second imaging sensor 219 (an example of a lens-side imaging sensor). The second interchangeable lens unit 204 forms an optical image of a subject on the second imaging sensor 219.

2.1: Second Interchangeable Lens Unit

The second interchangeable lens unit 204 has an optical system L2, a zoom driver for performing zooming, a focus adjuster for performing focusing, an aperture adjuster for adjusting the aperture, a lens-use image blur correction device for correcting image blur by adjusting the optical path, a lens controller 245 serving as a lens controller for controlling the operation of the second interchangeable lens unit 204, a nonvolatile memory 246 (an example of a sensor information storage section), a blur detector 251 for detecting the amount of image blur caused by shaking of the camera system, an image reader 252 for reading a captured subject image, a memory slot 232 in which a memory for holding image data is mounted, a contrast value detector 226 for detecting the focal point (the focal state of the subject image) from the contrast value of the subject image, an image transceiver 280 for exchanging image data with the camera body 101, and a wireless transceiver 281 for transmitting the above-mentioned communication exchanges. The optical system L2 forms an optical image of a subject. The optical image formed by the optical system L2 is formed on the second imaging sensor 219.

The second imaging sensor 219 converts an optical image of a subject into electrical image data by opto-electric conversion. Just as with the first imaging sensor 119, the second imaging sensor 219 is a CCD (charge coupled device) imaging sensor or a CMOS (complementary metal-oxide semiconductor) imaging sensor, for example. The second imaging sensor 219 may have specifications comparable to those of the first imaging sensor 119 installed in the camera body 101, but it is preferable to use an imaging sensor with fewer pixels and a smaller size than the first imaging sensor 119, which is favorable for moving picture imaging. Thus making the second imaging sensor 219 smaller makes it possible to reduce the size of the optical system L2, which is capable of a high zoom ratio. Also, the image data output rate of the second imaging sensor 219 is preferably faster than the image data output rate of the first imaging sensor 119. This is because the frame rate during moving picture imaging with the second imaging sensor 219 can be raised, and a smoother moving picture image can be obtained.

The zoom driver has a zoom lens group 260 that handles zooming, a zoom driver 261 for driving the zoom lens group 260 in the optical axis direction, and a zoom lens group controller 262 for controlling the operation of the zoom driver 261. The zoom driver 261 drives the zoom lens group 260 electrically. The zoom driver 261 is an electromagnetic actuator, or a vibrating type of actuator that makes use of a piezo-electric element, for example.

The focus adjuster has a focus lens group 242 for adjusting the focus, a focus driver 248 for driving the focus lens group 242 in the optical axis direction, and a focus lens group controller 247 for controlling the focus driver 248.

The aperture adjuster has an aperture 244 for adjusting how far the lens is stopped down or opened, and an aperture controller 249 that controls the operation of the aperture 244.

The focus lens group 242 is able to move in the optical axis direction over a range from the nearest focal position determined as a specification of the second interchangeable lens unit 204 to the infinity focal position. The focus lens group 242 also has a lens shift tolerance range over which movement is further possible back and forth in the optical axis direction beyond the above-mentioned range from the nearest focal position to the infinity focal position, for focal position detection by contrast method (discussed below).

The focus lens group controller 247 has an absolute position detector 247a for detecting the absolute position of the focus lens group 242 in the optical axis direction, and a relative position detector 247b for detecting the relative position. The absolute position detector 247a is able to detect at least one absolute position of the focus lens group 242 in the optical axis direction. The relative position detector 247b cannot detect an absolute position by itself, but is able to detect a movement direction, and makes use of a two-phase encoder, for example. Examples of two-phase encoders include a rotary pulse encoder, an MR element, and a Hall element, with two sensors being provided that alternately output binary signals at equal pitches according to the position of the focus lens group 242 in the optical axis direction. The two sensors are disposed to offset the phase of the pitches. The lens controller 245 computes the relative position of the focus lens group 242 in the optical axis direction from the output of the relative position detector. The lens controller 245 finds the relative position of the focus lens group 242 in the optical axis direction from the output of the absolute position detector 247a, finds the relative position from this position from the output of the absolute position detector 247a, and computes the absolute position of the focus lens group 242 in the optical axis direction on the basis of these.

The image blur correction device has a blur correction lens group 243, a blur correction lens driver 243a for driving the blur correction lens group 243 in a plane perpendicular to the optical axis X2, and a blur correction controller 250 for controlling the drive of the blur correction lens group 243. The image blur correction device further comprises a movement amount detector (not shown). The movement amount detector detects the actual amount of movement of the blur correction lens group 243, and along with the blur correction controller 250 forms a feedback control loop for controlling the drive of the blur correction lens group 243.

The lens controller 245 is a control device serving as the functional center of the second interchangeable lens unit 204, and is connected to the various components installed in the second interchangeable lens unit 204. More specifically, the lens controller 245 is equipped with a CPU, ROM, and RAM, and the lens controller 245 can perform many different functions when programs held in the ROM are read into the CPU.

For instance, the lens controller 245 has the function of putting the lens-use image blur correction device in a correction enabled state or a correction disabled state on the basis of a signal from the body controller 121. Also, the body controller 121 and the lens controller 245 are electrically connected by a body electrical contact 101b provided to the body mount 101a and a lens electrical contact 204b provided to the lens mount 204a, allowing information to be exchanged between them.

Also, various information (lens information) related to the second interchangeable lens unit 204 is held in a nonvolatile memory 246. This lens information includes, for example, information related to the model, for identifying the second interchangeable lens unit 204, such as the name of the manufacturer of the second interchangeable lens unit 204, the date of manufacture, the model number, the version of software installed in the lens controller 245, and information related to firmware updates (lens specification information), as well as information related to whether or not the second interchangeable lens unit 204 is equipped with an image blur correction device, and if an image blur correction device is installed, information related to detection performance, such as sensitivity and the model number of a shake detector 251, information related to correction performance, such as the maximum correctable angle and the model number of a shake correction controller 250 (lens-side correction performance information), the version of software for performing image blur correction, and so forth. Lens information also includes information related to power consumption required for drive of the blur correction controller 250 (lens-side power consumption information), and information related to the drive method of the blur correction controller 250 (lens-side drive method information). In addition, lens information includes information indicating whether or the second interchangeable lens unit 204 has an imaging sensor, and information related to the performance of the installed second imaging sensor 219, such as the pixel count. Furthermore, the nonvolatile memory 246 can hold information that has been sent from the body controller 121. This information can be held in a memory inside the lens controller 245 instead of in the nonvolatile memory 246.

The shake detector 251 comprises an angular velocity sensor for detecting movement of the second interchangeable lens unit 204 caused by hand shake or the like. The angular velocity sensor outputs a positive or negative angular velocity signal according to the direction in which the second interchangeable lens unit 204 is moving, using the output when the second interchangeable lens unit 204 is stationary as a reference. In this embodiment, two angular velocity sensors are provided for detecting movement in both the yaw direction and the pitch direction. The outputted angular velocity signal goes through filtering, amplification, and other such processing, is converted into a digital signal by an A/D converter, and is sent to the lens controller 245.

The second interchangeable lens unit 204 is mounted to the camera body 101 by fitting a lens mount 204a into a body mount 101a. As shown in FIG. 2, the lens mount 204a is attached in a direction perpendicular to the optical axis X2. More specifically, the center axis X3 of the lens mount 204a is substantially perpendicular to the optical axis X2. In this state, the optical axis X2 is disposed substantially parallel to a first light receiving face 119a of the first imaging sensor 119. The position of the lens mount 204a is not limited to this, however. For instance, as with the first interchangeable lens unit 104, the constitution may be such that the optical axis X2 is disposed substantially perpendicular to the first light receiving face 119a of the first imaging sensor 119.

The second interchangeable lens unit 204 further comprises a control member for operating the camera system B. More specifically, the second interchangeable lens unit 204 comprises a zoom button 263 (an example of a zoom control member) for performing zoom control, and a REC button 270 (an example of an imaging control member) for activating the start and end of recording in moving picture imaging.

2.2: Camera Body

Figure 6:
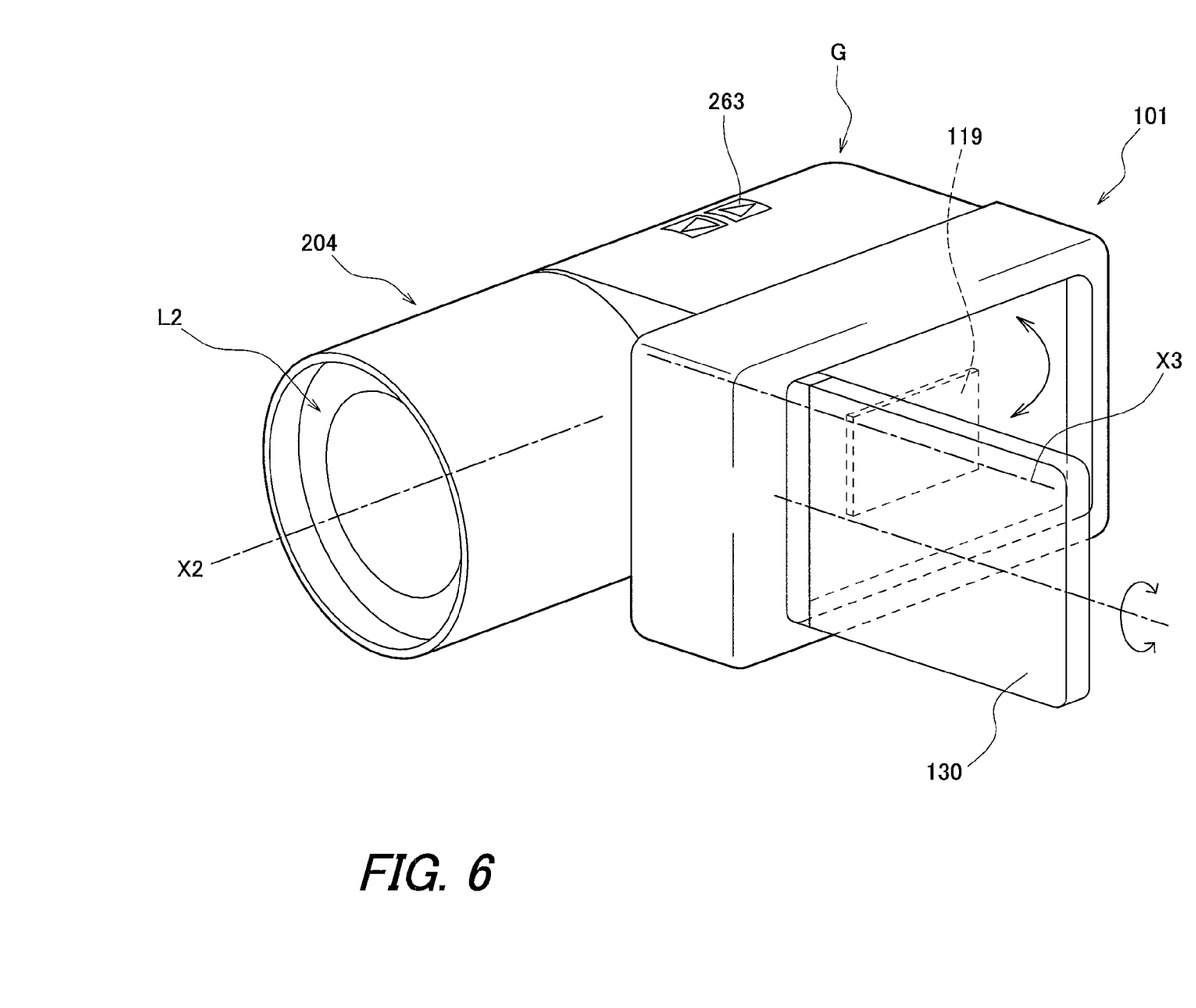
FIG. 6 is a simplified oblique view of a camera system (when the interchangeable lens unit has an imaging sensor)

In addition to the constitution discussed above, the camera body 101 comprises an image transceiver 283 (an example of an image data acquisition section) for sending and receiving images, and a wireless transceiver 282 with which transmission and reception by radio waves are possible. As shown in FIG. 2, since the above-mentioned lens mount 204a of the second interchangeable lens unit 204 is disposed on a face perpendicular to the optical axis X2, when the second interchangeable lens unit 204 is attached to the camera body 101, the user can hold the second interchangeable lens unit 204 like a video camera. More specifically, for example, imaging is performed with the user gripping a G part of the second interchangeable lens unit 204 (FIGS. 2 and 6). Therefore, the image display unit 130, which displays a captured image, a live view image, and various information, preferably has a variable angle with respect to the housing of the camera body 101 so that the image display unit 130 will be easier to view.

2.3: Operation Before Imaging

Figure 4:
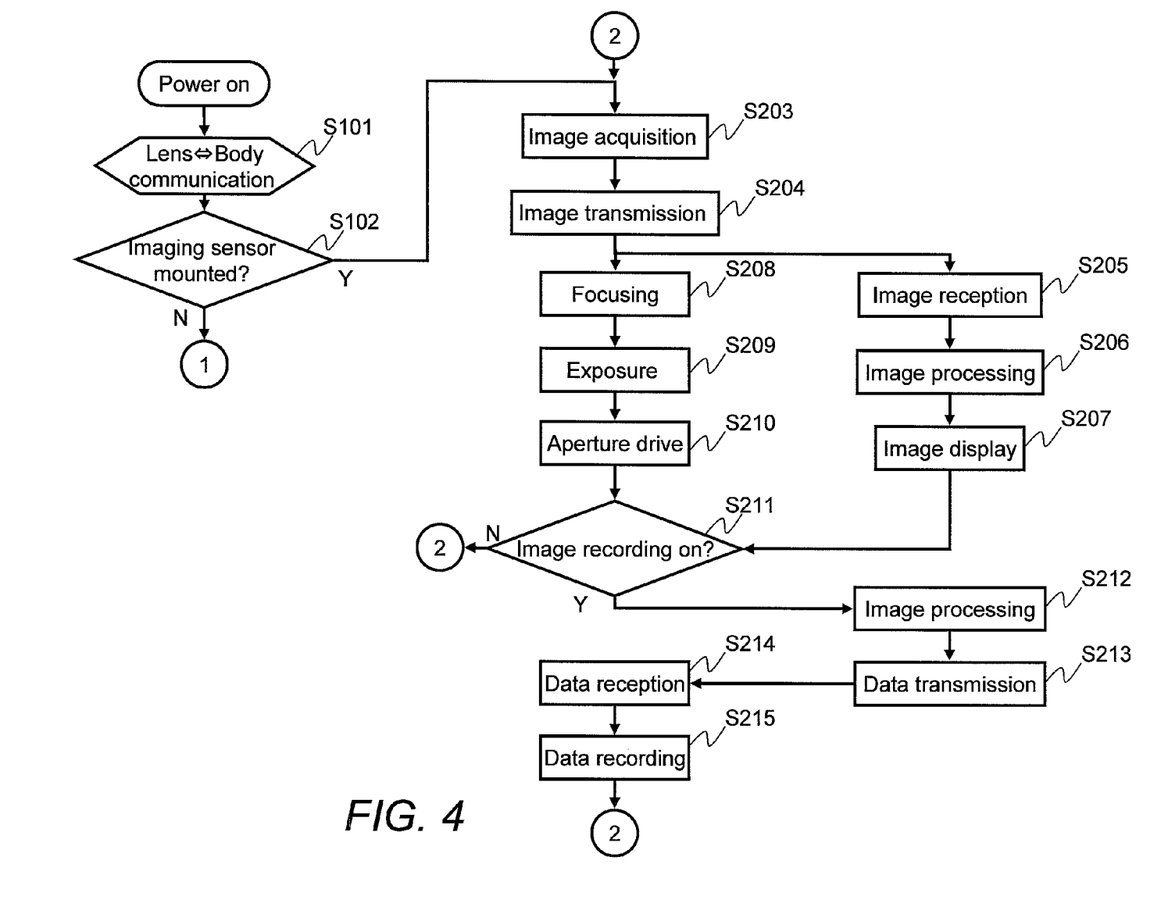
FIG. 4 is a flowchart of still picture imaging (when the interchangeable lens unit has an imaging sensor)

FIG. 4 is a flowchart of the operation of the camera system B when an interchangeable lens unit 204 having an imaging sensor is mounted. When the power supply (not shown) of the camera body 101 is switched on, power is supplied from the power supply (not shown) to the body controller 121 in the camera body 101 and the various units. Power is also supplied from the power supply to the lens controller 245 in the second interchangeable lens unit 204 and the various units via the lens electrical contact 204b and the body electrical contact 101b. When power is supplied, the body controller 121 and the lens controller 245 are activated.

The body controller 121 and the lens controller 245 are programmed to exchange information with each other at start-up via the lens electrical contact 204b and the body electrical contact 201b. For example, lens information related to the second interchangeable lens unit 204 is sent from a memory 145c of the lens controller 245 to the body controller 121 (step S101). This lens information is held in a memory 121c of the body controller 121.

At this point the body controller 121 decides whether or not the second interchangeable lens unit 204 is equipped with an imaging sensor on the basis of the lens information (step S102). For example, the imaging sensor selector 121d of the body controller 121 decides whether or not the second interchangeable lens unit 204 is equipped with an imaging sensor on the basis of imaging sensor information included in the lens information. When information indicating that an imaging sensor is installed is included in the imaging sensor information, the imaging sensor selector 121d decides that the second interchangeable lens unit 204 is equipped with an imaging sensor. When information indicating that an imaging sensor is installed is not included in the imaging sensor information, the imaging sensor selector 121d decides that the second interchangeable lens unit 204 is not equipped with an imaging sensor.

Alternatively, for example, lens specification information about the second interchangeable lens unit 204 is acquired, this lens specification information is compared to a table listing the relation between whether or not there is an imaging sensor and lens specification information had by the body controller 121, and the imaging sensor selector 121d decides whether or not the first interchangeable lens unit 104 is equipped with an imaging sensor.

In this embodiment, the second interchangeable lens unit 204 has the second imaging sensor 219, so when the second interchangeable lens unit 204 is mounted to the camera body 101, the imaging sensor selector 121d selects the second imaging sensor 219 as the selected imaging sensor. The selected imaging sensor is temporarily stored in a sensor storage component 121e of the body controller 121. While the second interchangeable lens unit 204 is mounted to the camera body 101, the selected second imaging sensor 219 is used to perform imaging.

2.4: Operation During Imaging

The operation of still picture imaging will be briefly described as an example. As shown in FIG. 2, light from a subject (not shown) goes through the second interchangeable lens unit 204 and is incident on the second imaging sensor 219. The subject image formed by the second imaging sensor 219 is converted into image data by the second imaging sensor 219 (step S203). The image transceiver 280 sends the image data to the camera body 101 (step S204). More specifically, the image transceiver 280 in the second imaging sensor 219 enters a state in which image data can be sent and received according to a specific protocol, and the image data is sent to the image transceiver 283 of the camera body 101 via the lens electrical contact 204b and the body electrical contact 101b. Wireless transmission by radio waves or the like may also be performed. In this case, the image transceiver 280 in the second interchangeable lens unit 204 sends the image data to the wireless transceiver 281, the wireless transceiver 281 wirelessly sends the image data to the wireless transceiver 282 of the camera body 101, and the wireless transceiver 282 of the camera body 101 receives the image data. The wireless transceiver 282 of the camera body 101 sends the image data to the image transceiver 283.

The image transceiver 283 of the camera body 101 receives the image data (step S205), the received image data is converted into image data with which image processing is possible, and this is sent to the body controller 121. The body controller 121 subjects the image data to image processing (step S206). Also, the subject image is displayed on the image display unit 130 on the basis of the image data (step S207). The user can view an erect image of the subject via the image display unit 130.

Meanwhile, a contrast value detector 226 calculates a contrast value on the basis of the image data produced by the second imaging sensor 219. The body controller 121 or the lens controller 245 performs a focusing operation using the contrast value (step S208). In this embodiment, the second interchangeable lens unit 204 is mainly intended for moving picture imaging. In moving picture imaging, it is preferable for focusing to be continued during live view and during imaging (recording). In view of this, the focus lens group controller 247 controls the focus driver 248 so that the focus lens group 242 undergoes minute reciprocal movement, known as a wobbling drive, in the optical axis direction. During wobbling drive, the contrast value detector 226 calculates the contrast value at a plurality of positions of the focus lens group 242. The focus lens group controller 247 controls the focus driver 248 so that the focus lens group 242 is driven to a position where the contrast value is larger. Contrast AF is performed when the body controller 121 or the lens controller 245 decides that the contrast value has dropped below a specific level.

Also, the body controller 121 or the lens controller 245 measures the brightness of the subject image on the basis of the image data from the second imaging sensor 219 (step S209). The body controller 121 or the lens controller 245 sends a command to the aperture controller 249 on the basis of the brightness of the subject image. The aperture controller 249 drives the aperture 244 so that the brightness of the subject image will be at a suitable value (step S210). During live view display and moving picture imaging (recording), exposure is preferably corrected in real time in response to changes in the external light, so the above-mentioned aperture drive is preferably repeated.

The operation from step S203 to step S210 is repeated until moving picture recording is switched on, that is, when moving picture recording is off (No in step S211). Control over live view display, focusing, and exposure correction is then carried out continuously.

Figure 5:
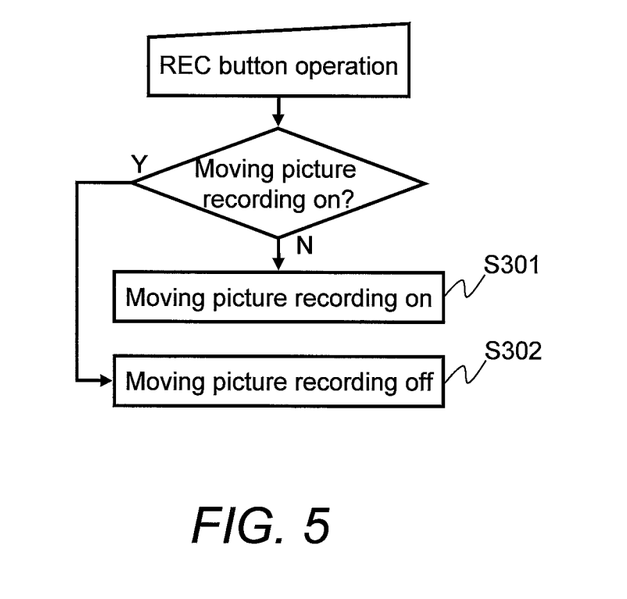
FIG. 5 is a flowchart of moving picture imaging (when the interchangeable lens unit has an imaging sensor)

As shown in FIG. 5, if the user presses the REC button 270 while steps S203 to S210 are being repeated when moving picture recording is off, then moving picture recording is switched on (step S301). If the user presses the REC button 270 again while steps S203 to S215 are being repeated when moving picture recording is on, then moving picture recording is switched off (step S302).

When moving picture recording is on (Yes in step S211), the body controller 121 subjects the image data received in step S205 to specific image processing suited to the production of a moving picture file. More specifically, the correction processor 121a subjects the image data to gamma correction processing, white balance correction processing, scratch correction processing, YC conversion processing, and electronic zoom processing. After this, the compression processor 121b subjects the image data to compression processing and so forth to produce data for a moving picture file.

After this, the data for the moving picture file is sent to the second interchangeable lens unit 204 (step S213). More specifically, the image transceiver 283 converts the data for the moving picture file in order to put it into a transmittable protocol, and transmits it to the image transceiver 280 of the second interchangeable lens unit 204 via the lens electrical contact 204b and the body electrical contact 101b. Transmission and reception may also be performed wirelessly. In this case, the data for the moving picture file is sent from the image transceiver 283 to the wireless transceiver 282, and send toward the wireless transceiver 281 of the second interchangeable lens unit 204. The wireless transceiver 281 of the second interchangeable lens unit 204 may receive this data and send it to the image transceiver 280.

The image transceiver 280 then restores the data for the moving picture file, and sends this data to the memory slot 232. The memory mounted in the memory slot 232 holds the data for the moving picture file (step S215). The wireless transmission and reception referred to here need not be only by radio waves, and may instead be by light waves.

The operation from steps S203 to S215 is repeated until the moving picture recording is switched off, that is, when the moving picture recording is on (Yes in step S211). Control over live view display, moving picture file production and recording, focusing, and exposure correction is then carried out continuously. When moving picture recording is switch off (step S302), the recording of the moving picture file is concluded. The operation from steps S203 to S210 can then be repeated.

3: Features of Camera Body and Camera System

Features of the camera body 101 and the camera system described above will be compiled below.

(1) With this camera body 101, when the first interchangeable lens unit 104 that guides an optical image to the first imaging sensor 119 is mounted to the body mount 101a, the first imaging sensor 119 is selected by the imaging sensor selector 121d on the basis of the imaging sensor information. On the other hand, when the second interchangeable lens unit 204 that has the second imaging sensor 219 is mounted to the body mount 101a, the second imaging sensor 219 is selected by the imaging sensor selector 121d on the basis of the imaging sensor information.

More precisely, if the imaging sensor information does not indicate that the first interchangeable lens unit 104 has the second imaging sensor 219, the imaging sensor selector 121d selects the first imaging sensor 119 as the selected imaging sensor. If the imaging sensor information indicates that the second interchangeable lens unit 204 has the second imaging sensor 219, the imaging sensor selector 121d selects the second imaging sensor 219 as the selected imaging sensor.

Therefore, in addition to a normal interchangeable lens unit having no imaging sensor, the camera body 101 is also compatible with an interchangeable lens unit that does have an imaging sensor. That is, this camera body 101 is compatible with a variety of interchangeable lens units.

(2) Since this camera body further comprising a sensor storage component 121e for storing as the selected imaging sensor the imaging sensor selected by the imaging sensor selector, if it is decided whether or not there is an imaging sensor when an interchangeable lens unit is mounted, then while that interchangeable lens unit is mounted, which imaging sensor to use can be decided on the basis of the information stored in the sensor storage component 121e.

(3) With this camera body 101, since the pixel count of the second imaging sensor 219 is smaller than the pixel count of the first imaging sensor 119, the second imaging sensor 219 will have a low image processing load than the first imaging sensor 119, for example, allowing faster processing. If the image processing loads are about the same, the image data output rate (frame rate) of the second imaging sensor 219 can be made faster than the image data output rate (frame rate) of the first imaging sensor 119. In this case, if the second imaging sensor 219 is used, smooth moving pictures can be captured. Also, the specifications of the first imaging sensor 119 can be determined without taking moving picture imaging into account.

Furthermore, since the size of the second imaging sensor 219 is larger than the size of the first imaging sensor 119, the optical system L2 can be made smaller than the optical system L1.

Therefore, an increase in the size of the second interchangeable lens unit 204 due to installing the second imaging sensor 219 can be reduced or prevented.

(4) With this camera system B, in a state in which the lens mount 204a of the second interchangeable lens unit 204 is mounted to the body mount 101a, the optical axis X2 of the optical system L2 is disposed substantially parallel to the first light receiving face 119a of the first imaging sensor 119. In this case, the user can perform imaging while gripping the second interchangeable lens unit 204, which is particularly effective when performing imaging over an extended period, such as in moving picture imaging.

Also, the second interchangeable lens unit 204 has the zoom driver 261 for electrically driving the zoom lens group 260, and the zoom button 263 for operating the zoom driver 261. Consequently, the zoom is easy to operate with the hand that grips the second interchangeable lens unit 204.

Furthermore, since the second interchangeable lens unit 204 has the REC button 270 for starting and stopping imaging, the starting and stopping of imaging can be easily controlled with the hand that grips the second interchangeable lens unit 204.

(5) With this camera system B, the distance H2 (FIG. 2) from the second imaging sensor 219 to the optical system L2 is shorter than the distance H1 (FIG. 1) from the first imaging sensor 119 to the face of the body mount 101a on the interchangeable lens unit side. In this case, an increase in the size of the second interchangeable lens unit 204 due to installing the second imaging sensor 219 can be reduced or prevented.

Other Embodiments

The present invention is not limited to or by the embodiments given above. Other embodiments of the present invention will be described in this section.

(A) When a moving picture is captured using the second interchangeable lens unit 204, a moving picture file may be held in the memory mounted in the memory slot 132 in the camera body 101, for example.

(B) The second interchangeable lens unit 204 may also be used to capture still pictures. Here, the body controller 121 may perform the same image processing as in step S110.

(C) The zoom button 263 may be provided to the camera body 101. Also, the REC button 270 may be provided to the camera body 101.

(D) A nonvolatile memory (recording component) fixed to the second interchangeable lens unit 204 may be used instead of the memory and memory slot 232 in the second interchangeable lens unit 204.

(E) In the above embodiments, the second interchangeable lens unit 204 comprises a lens mount 204a that can be coupled with the camera body 101 in a direction substantially perpendicular to the optical axis X2. In a state in which the second interchangeable lens unit 204 is mounted to the camera body 101, the first light receiving face 119a of the first imaging sensor 119 of the camera body 101 is substantially parallel to the optical axis X2 of the second interchangeable lens unit 204. However, the lens mount 204a is not limited to this position. For example, in a state in which the second interchangeable lens unit 204 is mounted to the camera body 101, the first light receiving face 119a of the first imaging sensor 119 of the camera body 101 may be substantially perpendicular to the optical axis X2 of the second interchangeable lens unit 204.

(F) The image display unit 130 need not be capable of variable angle operation. For example, the position of the image display unit 130 may be fixed with respect to the camera body 101.

(G) A display unit capable of displaying captured images in the same manner as the image display unit 130 may be provided to the second interchangeable lens unit 204.

Figure 7:
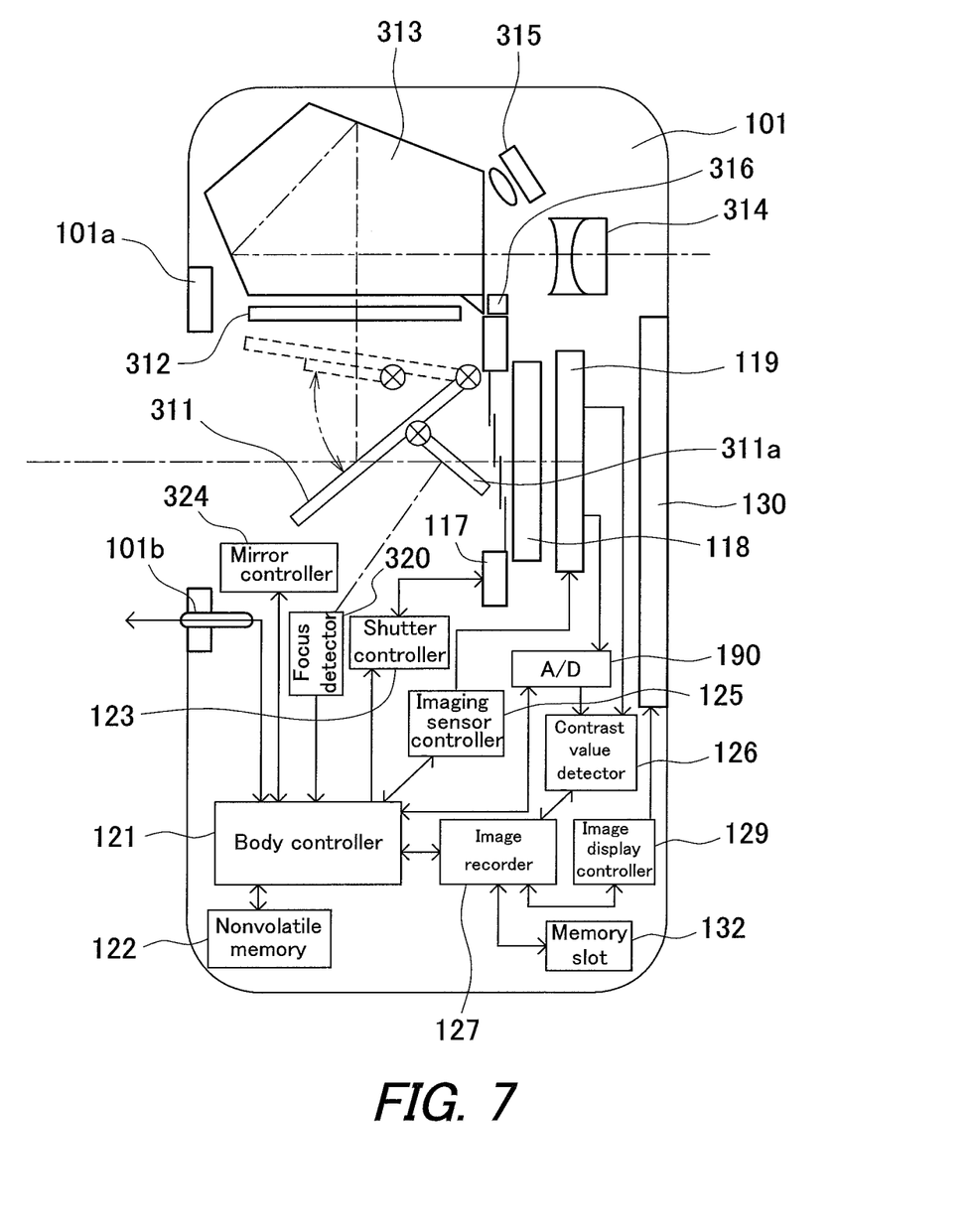
FIG. 7 is a simplified diagram of the constitution of a camera body (another embodiment).

(H) The camera body 101 may further comprise an optical viewfinder. More specifically, as shown in FIG. 7, for example, the camera body 101 may further comprise a quick-return mirror 311, a viewfinder screen 312, a sub-mirror 311a, a focal detector 320, a pentaprism 313, an eyepiece lens 314, a light metering sensor 315, an in-viewfinder display unit 316, a mirror controller 324, and so forth.

The quick-return mirror 311 guides incident light from the first interchangeable lens unit 104 to the viewfinder screen 312. The quick-return mirror 311 is semi-transmissive, and transmits part of the incident light. The subject image is projected onto the viewfinder screen 312 so that the subject image is displayed.

The sub-mirror 311a reflects incident light transmitted through the quick-return mirror 311 and guides it to the focal detector 320. The focal detector 320 receives the subject image, and uses this subject image to perform phase difference detection.

The pentaprism 313 converts the subject image projected onto the viewfinder screen 312 into an erect image. The eyepiece lens 314 enlarges the subject image from the pentaprism 313. The user sees the enlarged subject image through the eyepiece lens 314.

The light metering sensor 315 measures the brightness of the subject image projected onto the viewfinder screen 312. The in-viewfinder display unit 316 displays various information. The user can check the display of the in-viewfinder display unit 316 through the eyepiece lens 314.

The mirror controller 324 controls the drive on the basis of a control signal from the body controller 121 so that the quick-return mirror 311 and the sub-mirror 311a are retracted to outside the optical path X. Also, the mirror controller 324 controls the drive on the basis of a control signal from the body controller 121 so that the quick-return mirror 311 and the sub-mirror 311a are inserted into the optical path X.

What is claimed is:

1. A camera body to which can be mounted an interchangeable lens unit for forming an optical image of a subject, the camera body comprising:
    a body mount to which the interchangeable lens unit is removably mounted;
    a first imaging sensor configured to convert the optical image into first image data by opto-electric conversion;
    an information acquisition section configured to acquire imaging sensor information from the interchangeable lens unit; and
    an imaging sensor selector that selects the first imaging sensor as a selected imaging sensor on the basis of the imaging sensor information when an interchangeable lens unit configured to guide an optical image to the first imaging sensor is mounted to the body mount, and selects a second imaging sensor as the selected imaging sensor on the basis of the imaging sensor information when an interchangeable lens unit having the second imaging sensor is mounted to the body mount.

2. The camera body according to claim 1, wherein
    the imaging sensor selector selects the second imaging sensor as the selected imaging sensor when the imaging sensor information indicates that the interchangeable lens unit having the second imaging sensor.

3. The camera body according to claim 1, wherein
    the imaging sensor selector selects the first imaging sensor as the selected imaging sensor when the imaging sensor information does not indicate that the interchangeable lens unit having the second imaging sensor, or when the imaging sensor information indicates that the interchangeable lens unit does not have the second imaging sensor.

4. The camera body according to claim 1, further comprising
    a sensor memory configured to store a selected imaging sensor.

5. The camera body according to claim 1, further comprising a display unit configured to display image data produced by the selected imaging sensor as a visible image.

6. The camera body according to claim 1, further comprising a compression processor configured to subject image data produced by the selected imaging sensor to compression processing.

7. The camera body according to claim 1, further comprising
    a correction processor configured to subject image data produced by the selected imaging sensor to correction processing.

8. The camera body according to claim 1, further comprising
    a conversion processor configured to convert image data produced by the selected imaging sensor from an analog signal into a digital signal.

9. The camera body according to claim 1, further comprising
    an image data acquisition section configured to acquire image data produced by the second imaging sensor.

10. The camera body according to claim 9, wherein
    the image data acquisition section is configured to acquire the image data by wireless communication.

11. A camera system, comprising:
    an interchangeable lens unit configured to form an optical image of a subject; and
    the camera body according to claim 1.

12. The camera system according to claim 11, wherein
    a number of pixels of the second imaging sensor is smaller than a number of pixels of the first imaging sensor.

13. The camera system according to claim 11, wherein
    a size of the second imaging sensor is greater than a size of the first imaging sensor.

14. The camera system according to claim 11, wherein
    an image data output rate of the second imaging sensor is faster than an image data output rate of the first imaging sensor.

15. The camera system according to claim 11, wherein
    the camera body has a body mount,
    the interchangeable lens unit has a lens mount that can be mounted to the body mount, and in a state in which the lens mount is mounted to the body mount, the optical axis of the optical system is disposed substantially parallel to a first light receiving face of the first imaging sensor.

16. The camera system according to claim 11, wherein
    the camera body has a body mount,
    the interchangeable lens unit has a lens mount that can be mounted to the body mount, and
    a distance from the second imaging sensor to the optical system is shorter than a distance from the first imaging sensor to the face of the body mount on a side of the interchangeable lens unit.

17. The camera system according to claim 11, wherein
    the optical system has a zoom lens group, and
    the interchangeable lens unit has a zoom driver configured to electrically drive the zoom lens group, and a zoom control member configured to be operated when the zoom driver is actuated.

18. The camera system according to claim 11, wherein
    the interchangeable lens unit has an imaging control member configured to be operated when imaging is started or stopped.

19. The camera system according to claim 11, wherein
    the interchangeable lens unit has an image recorder configured to record the second image data.

20. The camera system according to claim 11, wherein
    the interchangeable lens unit has a memory slot into which a recording medium configured to record the second image data can be inserted.

* * * * *